(12) United States Patent
Chommeloux et al.

(10) Patent No.: US 8,800,971 B2
(45) Date of Patent: Aug. 12, 2014

(54) GAS-LIQUID CONTACT COLUMN AND METHOD USING A COMBINATION OF TRAYS AND PACKINGS

(75) Inventors: Bénédicte Chommeloux, Paris (FR); Viep Hoang Dinh, Bizanos (FR); Ludovic Raynal, Oullins (FR)

(73) Assignees: IFP Energies nouvelles, Rueil-Malmaison Cedex (FR); Total S.A., Courbevoie (FR)

(*) Notice: Subject to any disclaimer, the term of this patent is extended or adjusted under 35 U.S.C. 154(b) by 336 days.

(21) Appl. No.: 13/262,670

(22) PCT Filed: Apr. 1, 2010

(86) PCT No.: PCT/FR2010/000276
§ 371 (c)(1),
(2), (4) Date: Nov. 10, 2011

(87) PCT Pub. No.: WO2010/112709
PCT Pub. Date: Oct. 7, 2010

(65) Prior Publication Data
US 2012/0055337 A1 Mar. 8, 2012

(30) Foreign Application Priority Data
Apr. 3, 2009 (FR) ...................................... 09 01635

(51) Int. Cl.
*B01F 3/04* (2006.01)
(52) U.S. Cl.
USPC .................................... 261/114.1; 261/114.5

(58) Field of Classification Search
USPC .............................................. 261/114.1, 114.5
See application file for complete search history.

(56) References Cited

U.S. PATENT DOCUMENTS

| | | | | |
|---|---|---|---|---|
| 1,748,508 A | * | 2/1930 | Cooke | 95/214 |
| 1,865,172 A | * | 6/1932 | Cook | 261/114.1 |
| 5,244,604 A | | 9/1993 | Miller et al. | |
| 5,262,094 A | | 11/1993 | Chuang et al. | |
| 6,345,811 B1 | | 2/2002 | Yu et al. | |
| 2004/0099970 A1 | | 5/2004 | Zich et al. | |
| 2007/0023937 A1 | | 2/2007 | Buchanan | |

FOREIGN PATENT DOCUMENTS

| | | |
|---|---|---|
| DE | 1047749 | 12/1958 |
| EP | 0 381 388 A2 | 8/1990 |

* cited by examiner

*Primary Examiner* — Robert A Hopkins
(74) *Attorney, Agent, or Firm* — Antonelli, Terry, Stout & Kraus, LLP.

(57) ABSTRACT

The gas-liquid contact column comprises at least an upper tray 10 and a lower tray 10, as well as a downcomer 2 for sending the liquid from the upper tray to the lower tray. The trays comprise gas ports. A packing 11 is arranged between the upper tray and the lower tray. The upper tray comprises means 12 for withdrawing liquid from the upper tray, the liquid withdrawn being distributed over the packing.
The gas-liquid contact column is particularly well suited for absorption of the $CO_2$ and of the $H_2S$ contained in a natural gas or in a syngas, and for capture of the $CO_2$ contained in combustion fumes.

18 Claims, 6 Drawing Sheets

SAA    SD

SAA    SD

GAS-LIQUID CONTACT COLUMN AND METHOD USING A COMBINATION OF TRAYS AND PACKINGS

FIELD OF THE INVENTION

The invention relates to:
a gas-liquid contact column comprising at least two trays associated with a packing,
a gas-liquid contact method using a column comprising at least two trays associated with a packing according to the invention.

The invention applies to the treatment of any gaseous effluent, more precisely to the treatment of natural gas or syngas or to the capture of $CO_2$ contained in combustion fumes for example. The invention also applies to distillation or reactive distillation.

SCOPE OF THE INVENTION AND PRIOR ART

In distillation, reactive distillation, gas treatment or scrubbing methods, the mass and heat transfers between a gas phase and a liquid phase, generally circulating in a counter-current flow in columns (ascending gas and descending liquid), are achieved by means of technologies referred to as contactors that promote these transfers. There are three main contactor types, random packings, structured packings and column trays. The technological developments achieved in the past years aim to improve efficiency and capacity.

A contact efficiency gain allows to either reduce the number of trays of the column, which leads to a decrease in the column height and therefore to an investment cost reduction (with constant performance), or to obtain a performance gain, thus a gain on the product quality (with constant column geometry). A capacity gain allows to have higher flow rates, either gas or liquid flow rates, or both. This capacity gain can allow a flow rate gain with a constant column diameter by replacing the existing contactors by new and more capacitive contactors, which can allow to do without a new column or allow a gain on the diameter of the column in case of a new design. In both cases, an investment gain is expected. A capacity gain sometimes also leads to an operating cost gain. Indeed, in some gas scrubbing methods, smooth operation of the contactor is provided by a minimum value of the flow rate of liquid per unit of area. Using a more capacitive contactor then allows, for a given gas flow rate, to reduce the diameter of the column. Consequently, the flow rate of liquid per unit of area being maintained constant, the total flow rate of liquid decreases. The operating costs associated with the liquid circulation are thus reduced.

Column trays for gas distillation, scrubbing or treatment columns have been developed for many years and their dimensioning is well established as regards standard trays (see for example Engineering Data Book edited by Gas Processors Association, 1998).

A column 1 according to the prior art, as shown partly in FIG. 1, is equipped with many trays 10 on which contact between the ascending gas phase circulating as shown by the arrows in dotted thick lines and the descending liquid phase circulating as shown by the arrows in continuous thick lines occurs. The liquid flows down the upper tray via a downcomer 2 and flows across tray 10 on which a liquid level is retained via a dam 9 at the end of the tray. This liquid retention zone 4 is traversed by the gas coming from zone 3 below the contact tray, it is thus characterized by a strong bubbling promoting mass and heat transfer between the gas and the liquid. The two phases that have been contacted must then be separated. The gas continues its ascending progression through a mist zone 7 where the entrained drops fall back into transfer zone 4. The gas then flows through a zone 8 where no drop is entrained any more. The gas can then reach the upper tray. The liquid overflows out of dam 9 and falls into the downcomer. There is a first mixing zone 5 where the two phases are present. The section of downcomer has to be such as to cause a phase separation, i.e. the entrained gas bubbles can flow up towards the upper part whereas the liquid continues to flow down towards the lower tray, thus flowing through a zone 6 free of entrained gas.

In order to optimize dimensioning of the columns, during the past years development efforts have been particularly concentrated on the combination of column trays and of packings. Recent documents suggest to associate column trays with packings. The object of these inventions is always to provide better operation of the tray, either by improving contact between the gas and liquid phases on the tray by adding packings on the tray, which leads to an efficiency gain, or by improving the phase separation above the tray by setting a packing above the tray so as to act as a separator, which leads to a capacity gain. For example, document US-2004/0,099,970 discloses the setting of a packing above a tray in such a way that the rate of droplet entrainment from the lower tray to the upper tray is minimized. The packing is then considered as a separation element allowing notably to reduce the space between the trays, which eventually leads to a column height gain. In the case of document EP-0,381,388, a packing is set on the tray in such a way that it promotes mass transfer, which is favourable to a higher efficiency of the method. In the last two cases, the hydrodynamics of the gas and liquid streams is not significantly different from that of standard trays.

DESCRIPTION OF THE INVENTION

The present invention provides an original combination of a tray with a packing in such a way that part of the liquid is diverted from the tray and trickles directly onto the packing arranged below the tray. The liquid stream load in the downcomers is thus reduced, a packing volume is used instead of an empty volume so as to increase the transfer efficiency in the volume of the column, the gas phase is redistributed in the packing volume and the liquid-gas droplets are separated in the packing volume. All these effects contribute towards a higher efficiency and in particular an increase in the gas and liquid flow rate capacities.

SUMMARY OF THE INVENTION

In general terms, the present invention describes a gas-liquid contact column comprising at least an upper tray and a lower tray, as well as a downcomer for sending the liquid from the upper tray to the lower tray, the trays comprising gas ports. According to the invention, a packing is arranged between the upper tray and the lower tray, and the upper tray comprises means for withdrawing liquid from the upper tray, the liquid withdrawn being distributed over the packing.

According to the invention, said means can be determined for withdrawing between 5% and 80% of the liquid circulating on the upper tray. Said means can comprise tubes. The height of the tubes can range between 2 cm and 10 cm, preferably between 4 cm and 6 cm, and their diameter can range between 0.5 cm and 3 cm. Said tubes can comprise an upper opening oriented opposite the flow of liquid on the upper tray.

Said means can be selected so as to prevent passage of the gas through said means.

The packing can be selected from among random packings and structured packings.

The present invention also provides a gas-liquid contact method comprising:

feeding a gas into the bottom of a column comprising at least an upper tray and a lower tray, feeding a liquid into the top of the column, sending a first part of the liquid from the upper tray to the lower tray through a downcomer, characterized in that it comprises:

arranging a packing between the upper tray and the lower tray, collecting a second part of the liquid from the upper tray using withdrawal means, and distributing, through said withdrawal means, said second part of the liquid over the packing so as to contact the gas circulating in the packing with said second part of the liquid.

According to the invention, the second part of the liquid can consist of between 5% and 80% of the liquid circulating on the upper tray.

The method according to the invention can be used for one of the following applications: distillation, reactive distillation, capture of the $CO_2$ contained in combustion fumes, absorption of at least one of the $CO_2$ and $H_2S$ compounds contained in a natural gas or a syngas.

DETAILED DESCRIPTION OF THE INVENTION

Figure 2:
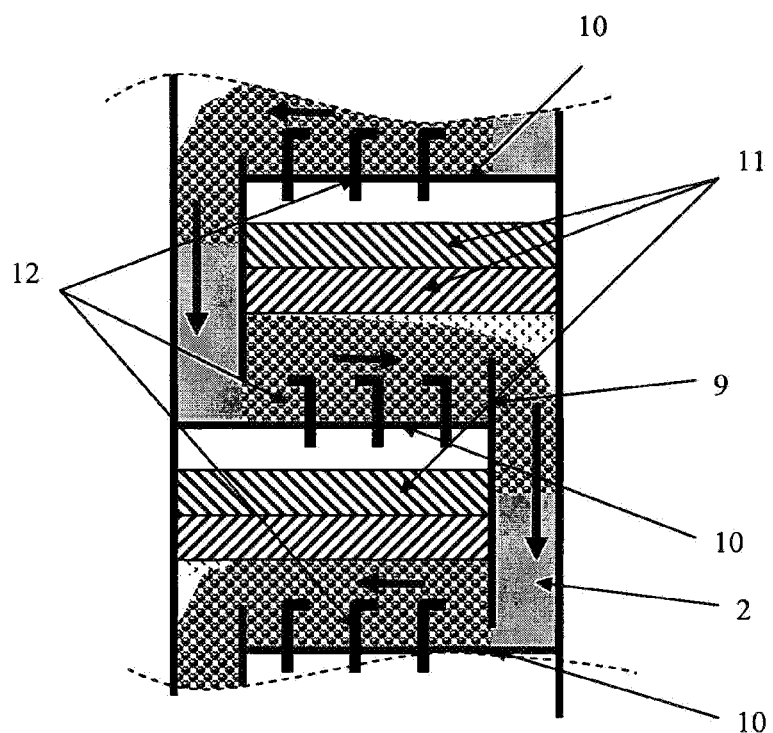

The present invention, diagrammatically shown in FIG. 2, consists on the one hand in modifying trays 10 so as to add specific liquid redistribution systems 12 thereto and, on the other hand, in setting packing 11 placed directly on the trays or positioned above them. The object of liquid redistribution systems 12 is to withdraw part of the liquid stream on the tray and allow it to trickle over packing 11 arranged below this tray. In other words, the liquid circulating on the tray according to the invention is divided into two fractions. A fraction of the liquid is collected and directly sent onto the upper part of the packing located below the tray by elements 12. The liquid collected by elements 12 flows through packing 11 prior to reaching the lower tray. In packing 11, the liquid fraction withdrawn by elements 12 is contacted with the ascending gas phase. The remaining part of the liquid on the tray flows through dam 9 and flows down through downcomer 2 directly onto the lower tray without flowing through the packing.

The number and the size of liquid redistribution elements 12 have to be adjusted so as to send to the packing between 5% and 80% of the liquid, preferably between 10% and 50% of the liquid. The remaining liquid fraction flows through downcomer 2 and reaches the lower tray.

Figure 1:
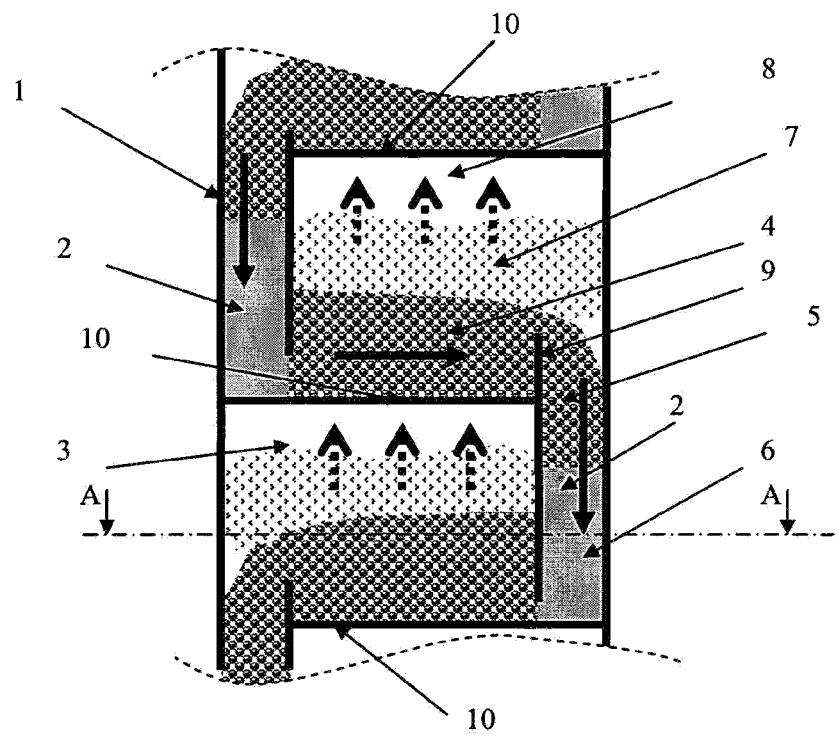
FIG. 1 diagrammatically shows a portion of a tray column according to the prior art, FIG. 2 diagrammatically shows a portion of a tray column associated with packings according to the invention, FIG. 3 diagrammatically shows a top view of a tray according to the prior art, FIG. 4 diagrammatically shows a top view of a tray according to the invention.
Figure 3:
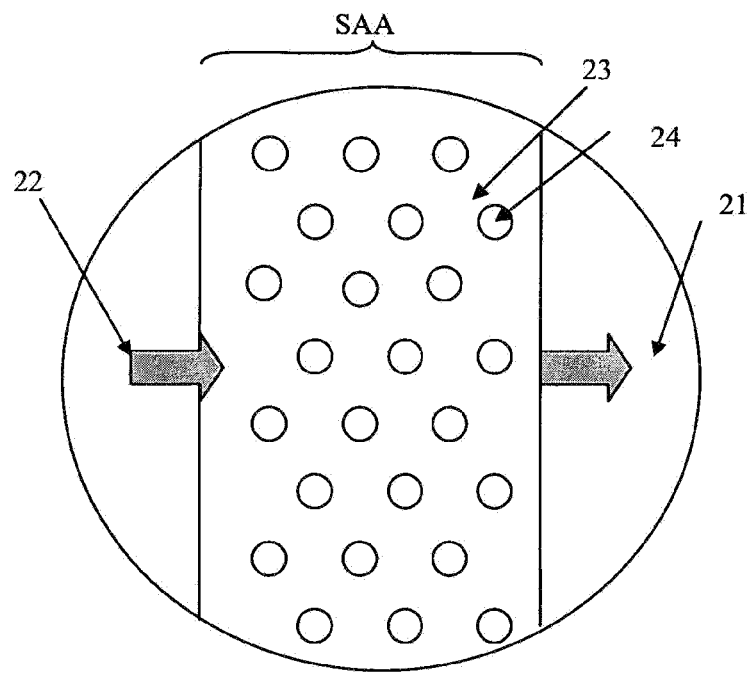
Figure 4:
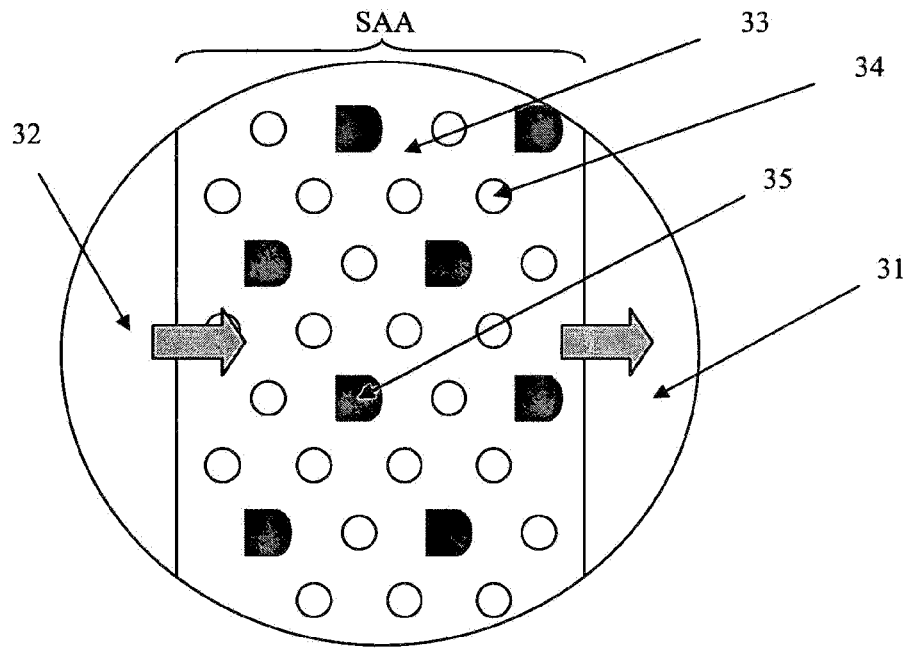

FIGS. 3 and 4 are top views along section AA, shown in FIG. 1, of the trays (23 or 33 of active area section SAA) respectively in the case of the state of the art (FIG. 3) and of the present invention (FIG. 4). Sections 22 and 32 correspond to the downcomers from the upper tray. Sections 21 and 31 correspond to the downcomers feeding the lower tray. The liquid flow on the trays is shown by the arrows, from left to right in FIGS. 3 and 4. The gas circulates upwards through ports 24 or 34. In FIG. 4, the tray according to the invention comprises liquid withdrawal systems 35. For example, in relation to the tray of FIG. 3, in FIG. 4 one gas port out of four has been replaced by a liquid withdrawal system 35.

Figure 5A:
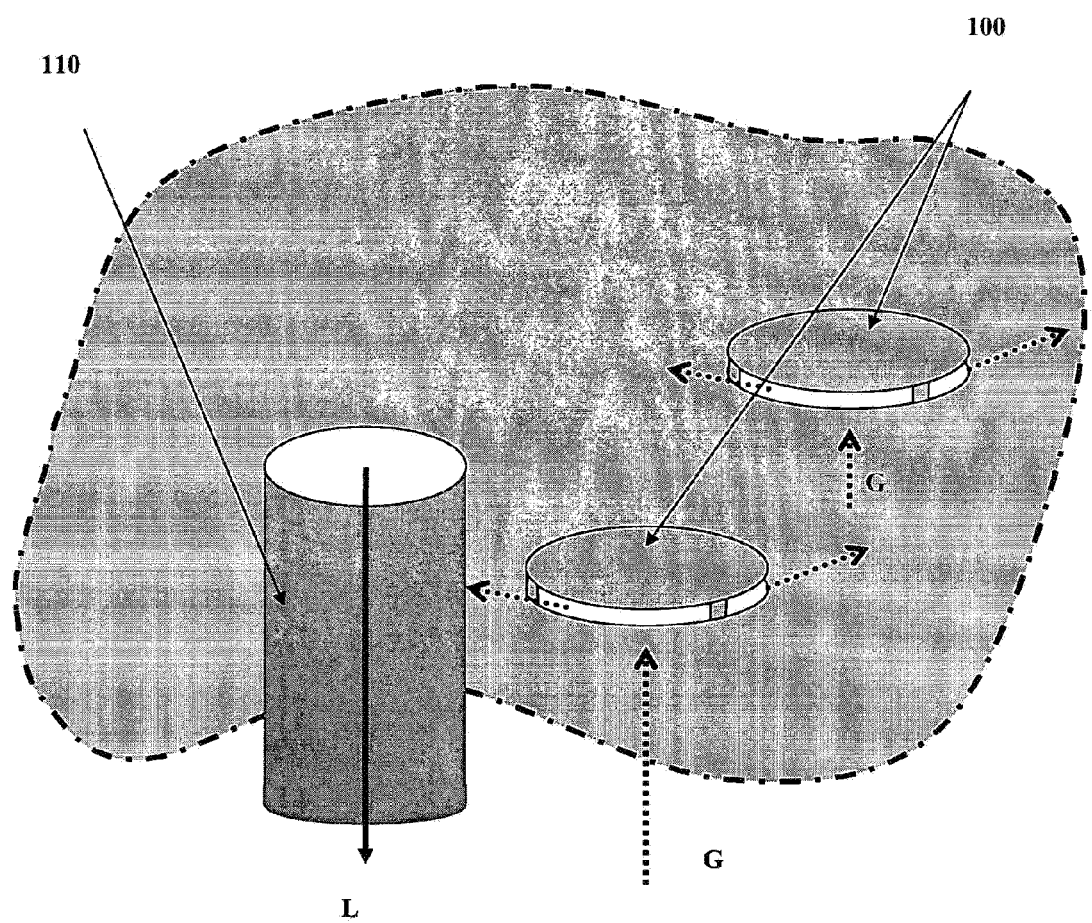
FIGS. 5a and 5b show liquid redistribution elements according to the invention.
Figure 5B:
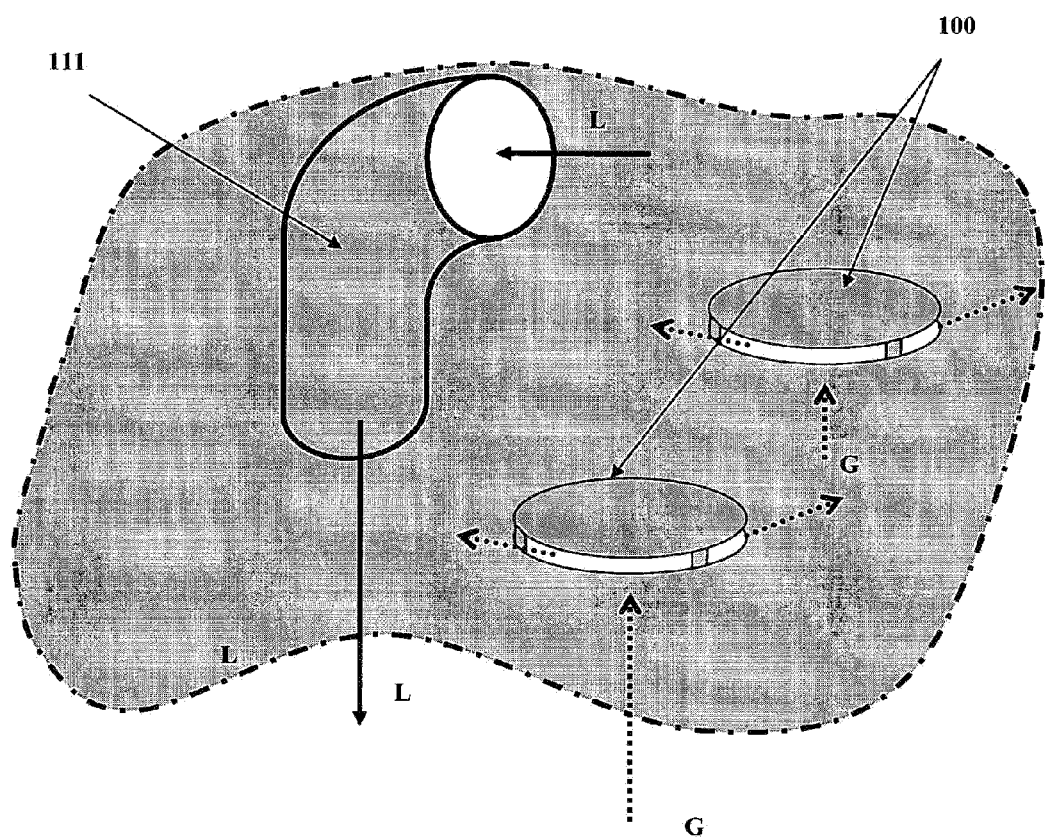

Various liquid redistribution element geometries are shown in FIGS. 5a and 5b. The gas ports are represented as valves 100. A perforated tray type technology, well suited for setting of the packing, can also be used. The arrows in dotted line diagrammatically show the path of gas G. The liquid redistribution system can come in different forms. With reference to FIG. 5a, the liquid redistribution system comprises a line 110 running through the tray. The position of the upper opening and the inner section of the line are notably so selected as to allow only descent of liquid L from the tray to the packing arranged below the tray as shown by the arrow in full line. With reference to FIG. 5b, the redistribution system consists of a line 111 whose upper end is bent in such a way that the face open to the liquid faces the liquid flow. In other words, the face open to the liquid is vertical and is oriented in the direction of section 32, as shown in FIG. 4, of the downcomer coming from the upper tray.

It is important that the liquid redistribution system according to the invention be a line allowing passage of the liquid from the tray to the lower space, and not a line allowing passage of the gas from the lower space to the tray. The section of the line can have any shape (circular, rectangular, etc.). The number, the diameter and the height of the liquid redistribution elements must be suited to the liquid stream flowing towards the packing, so as to prevent passage of the gas.

More precisely, the active area of the liquid redistribution elements, i.e. the sum of the area of the sections of the tubes of a tray, represents between 1% and 20% of the total active area of the tray, preferably between 1% and 5%. The tubes forming the liquid redistribution elements have a height ranging between 2 cm and 10 cm, preferably between 4 cm and 6 cm. Their diameter ranges between 0.5 cm and 3 cm. The number of tubes on a tray depends on the size of the column. For information, a minimum amount of 5 tubes per tray is necessary for smooth operation of the invention. However, the number of tubes per tray can go up to several ten tubes, or even up to 100 tubes per tray.

The present invention thus consists in adapting any type of existing tray (valve tray, bubble-cap tray, perforated tray, etc.) for combined use with the random or structured packing. We have a preference for the valve type tray associated with a structured packing. The liquid redistribution elements must be added to the existing trays. Their geometrical characteristics and their number are adjusted according to the use considered for the column. The collection and redistribution elements allow the liquid to be distributed homogeneously on any type of existing packing, preferably structured packings with a high void fraction. It may be interesting to reduce the height of the packing disks (industrial values close to 200 mm) down to a height preferably equal to 100 mm. This allows two disks to be preferably laid at alternate angles of 90° in relation to one another in their principal direction.

The combination according to the invention of the tray with a packing and liquid distribution means from the tray onto the packing has many advantages.

In the first place, it allows to use a large portion of the volume of the column which, without addition of a packing, is almost totally unused as regards transfer. The volume consisting of zones 7 and 8 of FIG. 1 is also large, or even larger than the volume fully used for contact 4. Within the scope of the present invention, these zones 7 and 8, hardly contributory to gas/liquid contact, are filled by packing 11 in FIG. 2. Packing 11 is supplied with liquid by means of liquid collection and distribution systems 12. According to the invention, the packing can then act as a contactor, the liquid streaming along the packing and the gas circulating in a counter-current flow in the heart of the packing. The packing can be of random or structured type (for example of Intalox saddle, IMTP50, Montz 200 or Mellapak 250 type). The packing can be selected so as to allow to have the required gas and liquid flow rates. This effective volume gain induces a high efficiency gain, which can thus lead to a gain on the column height.

Second, using a packing above the tray allows the gas phase to be redistributed. In fact, with reference to FIG. 3, the cross-section of flow useful to the gas phase corresponds, in the case of the prior art, to the active area section SAA. Section 22 corresponding to the downcomer of the upper tray does not allow passage of the gas. Section 21 of area SD corresponding to the space located above the downcomer towards the lower tray remains free for passage of the gas, but without being used in reality.

Adding a packing according to the invention allows the gas to be redistributed over active area section SAA+the area above the downcomer (area SD). This redistribution leads to a lower local gas velocity. Some drops formed at the gas/liquid interface above the active area are carried along by the gas and they are, in the case of the prior art, separated from the gas phase in the disengagement zone, zone 7 in FIG. 1, in a gas stream characterized by a gas velocity $Ug\_{prior\ art}$ given by the relation:

$$Ug\_{prior\ art} = Qg/SAA \quad (1)$$

where Qg corresponds to the volume flow rate of gas. In order not to carry drops towards the upper tray (flooding phenomenon), which causes column performance deterioration, this velocity has to be lower than a critical gas velocity $U_{G\_critical}$ above which the droplets are carried along, i.e.:

$$Ug < U_{G\_critical} \quad (2)$$

Redistributing the gas over section {SAA+SD} allows to modify the calculation expression for Ug, which becomes:

$$Ug = Ug\_{present\ invention} = Qg/(SAA+SD) \quad (3)$$

This redistribution thus allows to have a higher gas flow rate while respecting the criterion of Equation (2). The present invention therefore allows a capacity gain to be obtained in terms of gas flow rate in case of revamping of an existing column (so as to have a higher flow rate in an existing column) or a gain on the column diameter (case of the design of a new column).

Third, having liquid withdrawal systems on the trays, which allow spraying onto the packing arranged below these trays, leads to a decrease in the flow rate of the liquid overflowing into the downcomer. Now, the section of these downcomers is so selected that the velocity of the liquid is below a certain critical velocity of the liquid $U_{L\_critical}$, so that the bubbles corresponding to the gas fraction carried along in zone 5 of FIG. 1 can disengage and flow up. There are two possibilities as regards the use of this advantage. Either the liquid flow rate is raised, or, with a constant total liquid flow rate in the column, the section of flow SD of chimneys 32 and 31 (FIG. 4) can be reduced, which leads to a column diameter decrease in the case of a new unit, or allows to increase the treatment capacity in an existing plant, in which case the section of flow of the gas can be increased. The present invention thus allows to have a capacity gain in terms of gas and liquid flow rate in case of revamping of an existing column (so as to have a higher flow rate in an existing column) or a gain on the column diameter (case of the design of a new column).

Finally, setting a packing above the tray allows to limit entrainment of the droplets, created at the gas/liquid interface on the tray, towards the upper tray. In fact, these droplets will impact the surface of the packing and coalesce with the liquid film circulating in a counter-current flow on this packing. This effect allows to increase the gas velocity without performance degradation (less drops carried along). Once again, there is a gain on either the gas flow rate, if it is desired to increase it in an existing plant in place of a standard equipment, or on the column size (diameter gain) in case of dimensioning of a new column.

Example 1

Figure 6:
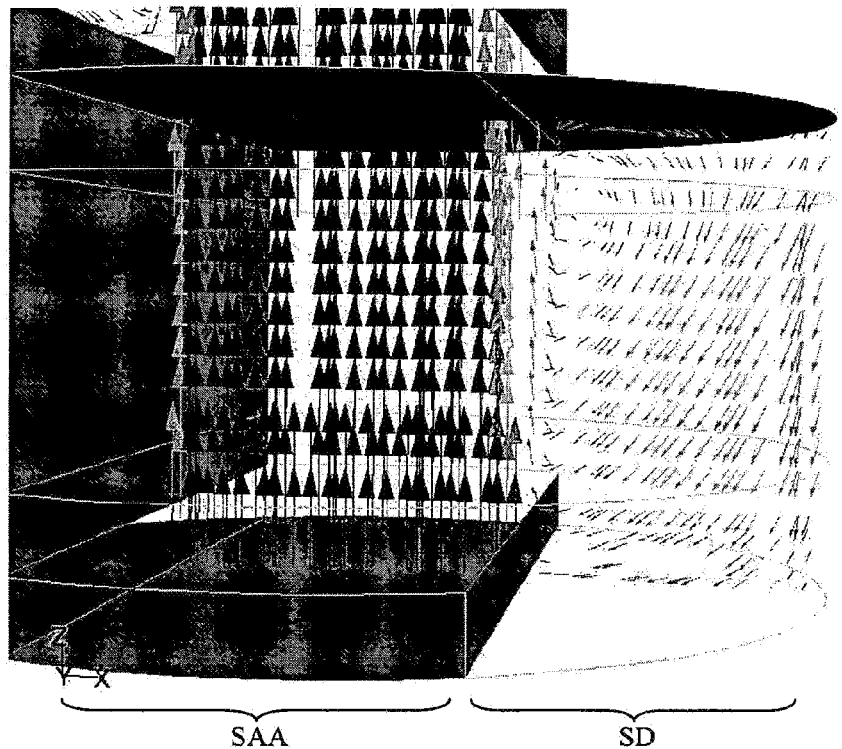
FIG. 6 shows the gas flow in a tray column according to the prior art.
Figure 7:
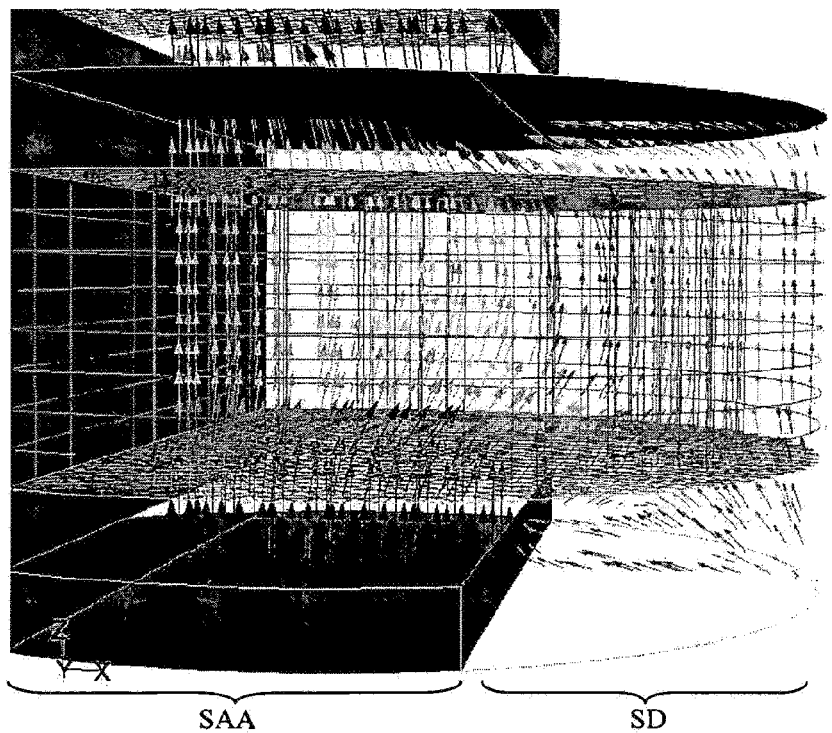
FIG. 7 shows the gas flow in a packed tray column according to the invention.

Numerical calculations carried out using the commercial Numerical Flow Simulation software Fluent 6.2 allow to test the redistribution over a 0.94 m-diameter column, at an Fs of 1.1. The Fs characteristic corresponds to the product of the empty-bed velocity of the gas by the root of the gas density under the operating conditions of the method. FIGS. 6 and 7 show the velocity vectors of the gas circulating in the inter-tray space.

In FIG. 6, without packing, a strong recirculation is observed above area SD of the descending downcomer, thus limiting the section of flow useful to gas passage to the section corresponding to active area SAA. In FIG. 7, with packing, the gas phase is redistributed over the section comprising active area SAA and area SD above the downcomer, and there is no more recirculation.

Figure 8:
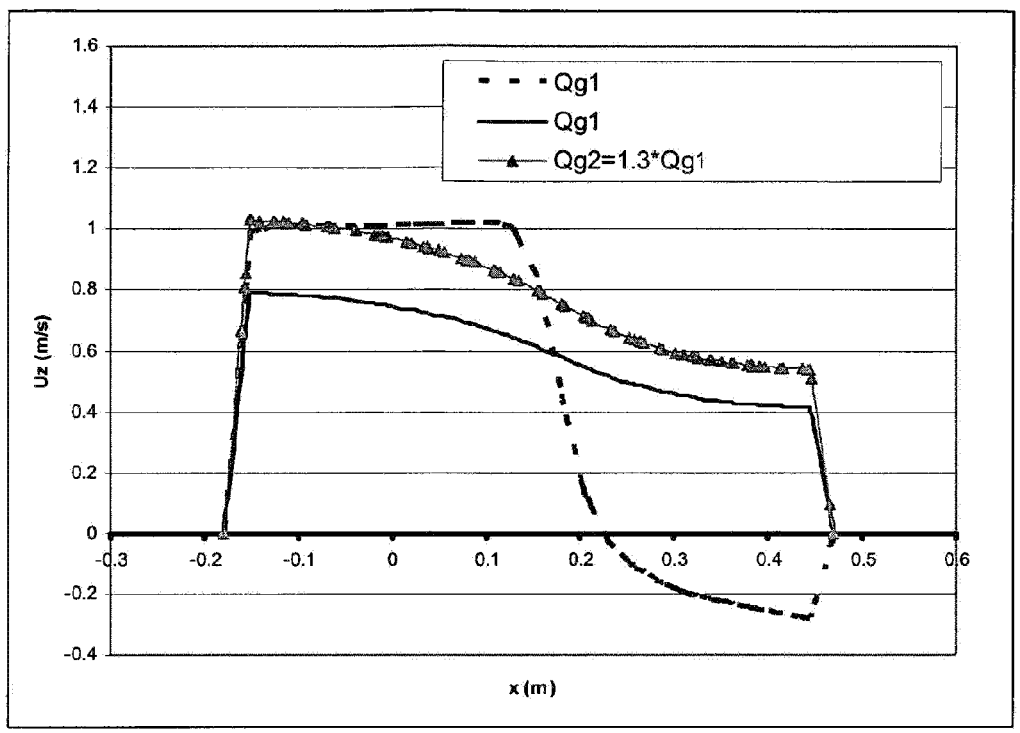
FIG. 8 shows velocity profiles at the centre of columns according to the prior art and according to the invention in the inter-tray space.

FIG. 8 shows three gas velocity profiles Qg1, Qg1' and Qg2 at the centre of the column in the inter-tray space. Qg1 corresponds to a tray column without packing. Qg1' corresponds to a column according to the invention, i.e. with trays, packings and means for liquid redistribution from the tray to the packing. Qg2 corresponds to a second profile in a column according to the invention with a higher gas velocity. As shown in FIG. 8, the velocity changes from a maximum velocity on profile Qg1 of 1 m/s without packing to a velocity below 0.8 m/s on profile Qg1', with an identical gas flow rate. If one considers that the allowable maximum velocity for preventing droplet entrainment is 1 m/s, the present invention allows a 30% gain on the gas flow rate since, with a flow rate that is 1.3 times the initial flow rate (see profile Qg2), the same maximum velocity value as in the case of the prior art (profile Qg1) is observed.

Example 2

The operating method according to the invention is also illustrated by experimental measurements. These tests compare the absorption of the oxygen of the air by deoxygenated water. Two types of contactor have been tested:

a column with standard perforated trays (column A)

a column with the geometry according to the invention (column B): identical to column A with addition of trays as described in the invention and a Mellapak 250 packing disk arranged between two successive trays.

The diameter of the two columns is identically equal to 300 mm, the total useful height is in both cases 0.40 m.

The trays as described in the invention have the following geometrical characteristics:

18 straight tubes as described in FIG. 5a, 0.06 m in height and 0.01 m in diameter, the area of the redistribution elements represents 30% of the active area of the tray.

In the operating range tested (gas flow rate between 200 and 600 m³/h, liquid flow rate between 0.5 and 4 m³/h, atmospheric pressure and ambient temperature), the absorption rate in column B is higher than the rate obtained in column A by 2 to 30%.

Furthermore, flooding of column B occurs later than that of column A since, for the same wetting ratio (ratio of the liquid flow rate to the column surface area), a larger amount of gas can be sent to column B prior to measuring the flooding.

The table below shows the gas capacity gain before flooding of column B in relation to column A for a given wetting ratio.

| Wetting ratio (m³/m²/h) | Gain on gas capacity |
|---|---|
| 33 | 11% |
| 47 | 27% |

The invention claimed is:

1. A gas-liquid contact column comprising at least an upper tray and a lower tray, a downcomer for sending the liquid from the upper tray to lower tray, the trays comprising gas ports, characterized in that a packing is arranged between the upper tray and the lower tray, and the upper tray comprises means for withdrawing the liquid from the upper tray, the liquid withdrawn being distributed over the packing.

2. A column as claimed in claim 1, characterized in that said means are determined for withdrawing between 5% and 80% of the liquid circulating on the upper tray.

3. A column as claimed in claim 1, characterized in that said means comprise tubes.

4. A column as claimed in claim 3, wherein the height of said tubes ranges between 2 cm and 10 cm, and the diameter thereof ranges between 0.5 cm and 3 cm.

5. A column as claimed in claim 3, wherein said tubes comprise an upper opening oriented opposite the flow of liquid on the upper tray.

6. A column as claimed in claim 1, wherein said means are so selected as to prevent passage of the gas through said means.

7. A column as claimed in claim 1, characterized in that the packing is selected from among random packings and structured packings.

8. A column as claimed in claim 4, wherein the height of said tubes ranges between 4 cm and 6 cm.

9. A gas-liquid contact method comprising:
   feeding a gas into the bottom of a column comprising at least an upper tray and a lower tray,
   feeding a liquid into the top of the column,
   sending a first part of the liquid from the upper tray to the lower tray through a downcomer,
characterized in that the method further comprises:
   arranging a packing between the upper tray and the lower tray,
   collecting a second part of the liquid from the upper tray using withdrawal means, and
   distributing, through said withdrawal means, said second part of the liquid over the packing so as to contact the gas circulating in the packing with said second part of the liquid.

10. A method as claimed in claim 9, wherein the second part of the liquid consists of between 5% and 80% of the liquid circulating on the upper tray.

11. A distillation process comprising the method as claimed in claim 9.

12. A reactive distillation process comprising the method as claimed in claim 9.

13. A process of capturing $CO_2$ contained in combustion fumes comprising the method as claimed in claim 9.

14. A process of absorption of at least one of $CO_2$ and $H_2S$ contained in a natural gas or a syngas comprising the method as claimed in claim 9.

15. A gas-liquid contact column comprising:
   a plurality of trays comprising gas ports;
   a downcomer for sending a liquid from an upper tray of the plurality of trays to a lower tray of the plurality of trays;
   a packing disposed between the upper tray of the plurality of trays and the lower tray of the plurality of trays; and
   at least one liquid redistribution pathway disposed through the upper tray of the plurality of trays, the at least one liquid redistribution pathway for withdrawing the liquid from the upper tray of the plurality of trays and distributing the withdrawn liquid over the packing.

16. A column as claimed in claim 15, wherein the at least one liquid redistribution pathway withdraws between 5% and 80% of the liquid circulating on the upper tray.

17. A column as claimed in claim 15, wherein the at least one liquid redistribution pathway comprises a tube.

18. A column as claimed in claim 17, wherein the tube comprises an opening facing a flow direction of the liquid across the upper tray of the plurality of trays.

* * * * *